Aug. 21, 1962 — W. B. BARRY ETAL — 3,050,107
FILM SPLICER
Filed May 31, 1960 — 3 Sheets-Sheet 1
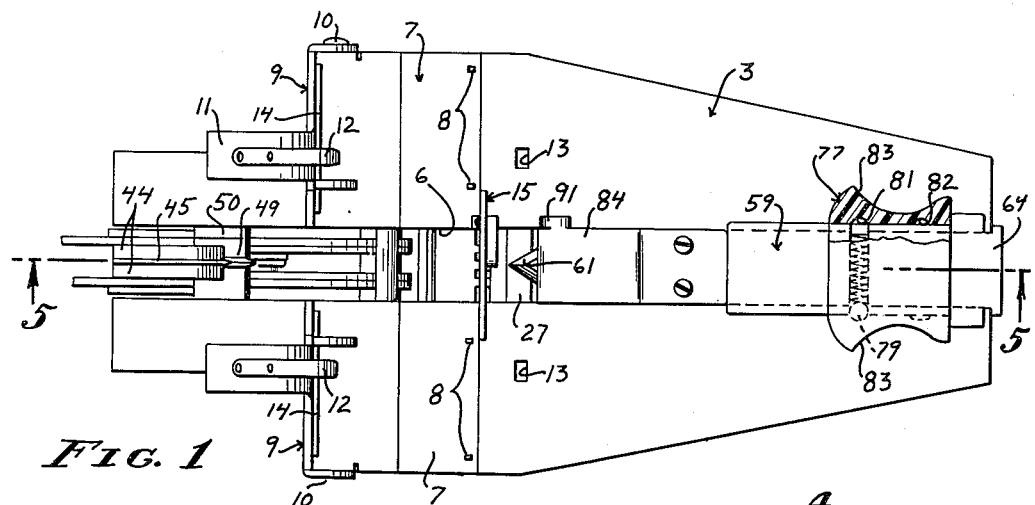
FIG. 1
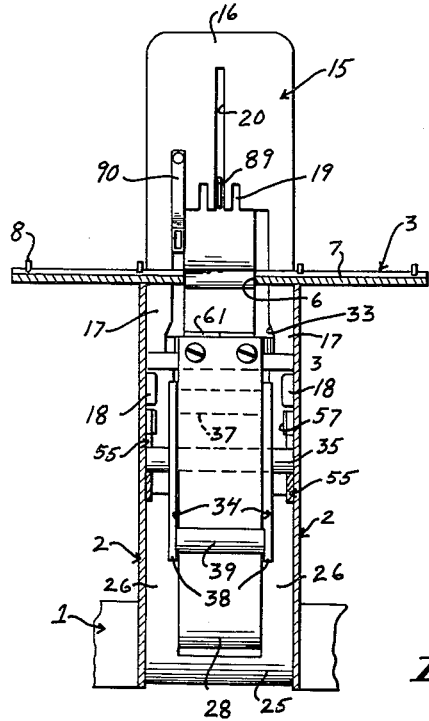
FIG. 2
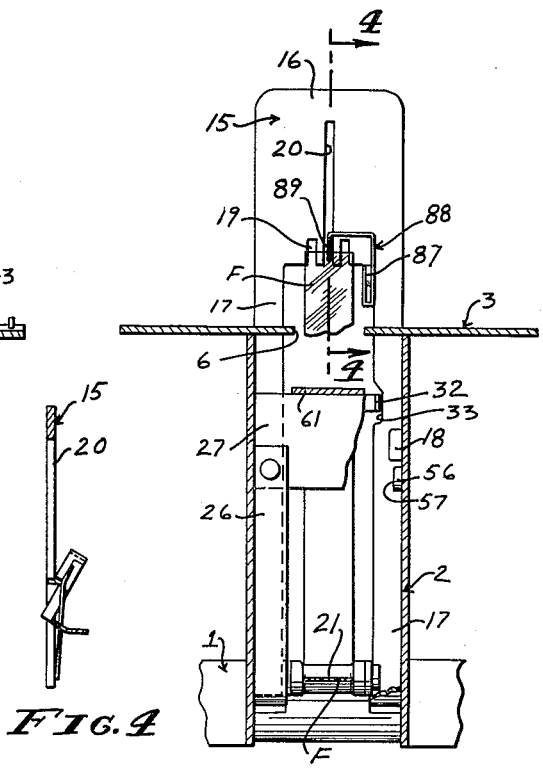
FIG. 3 / FIG. 4
INVENTORS
WILLIAM B. BARRY
PHILIP T. ADAMS
BY
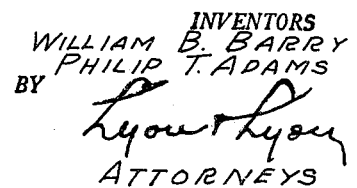
ATTORNEYS

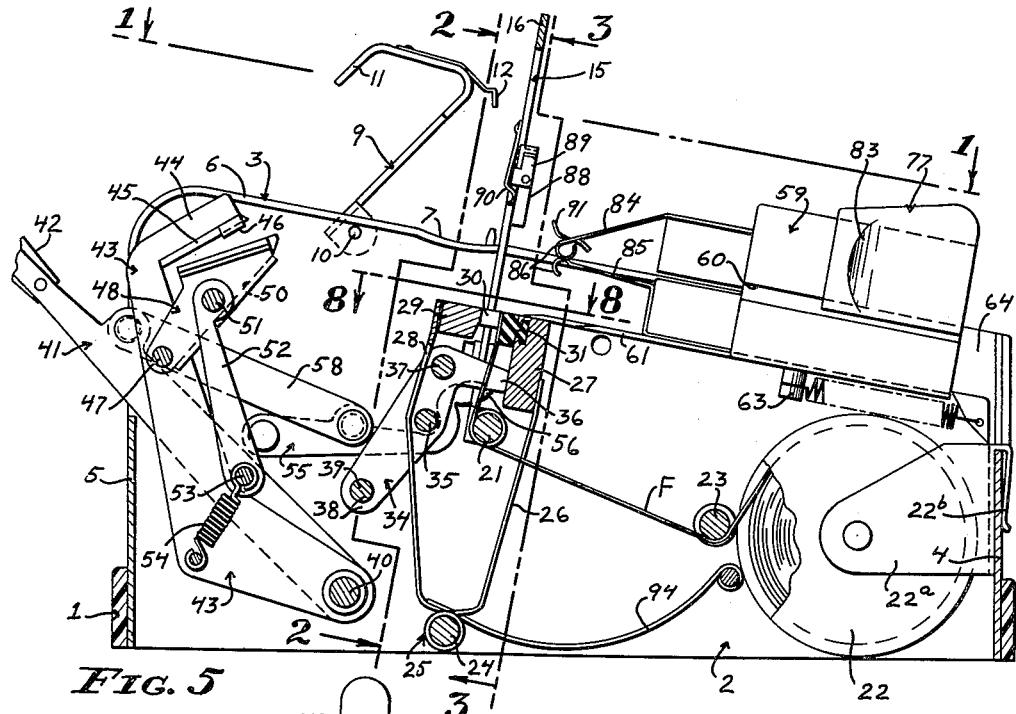

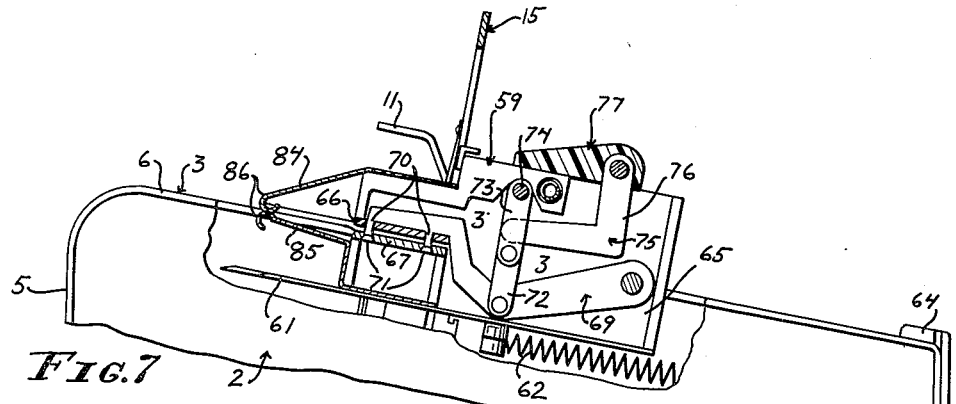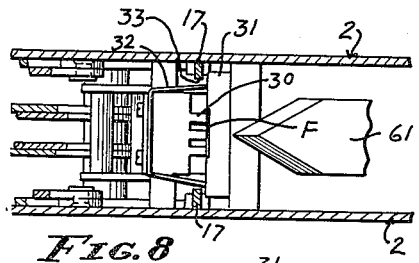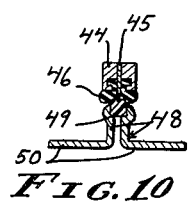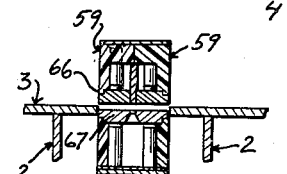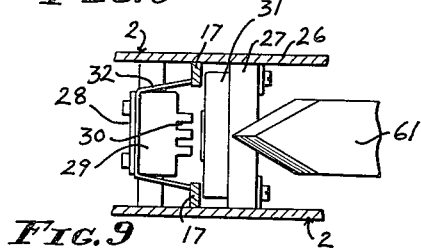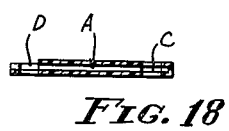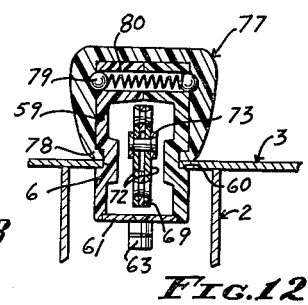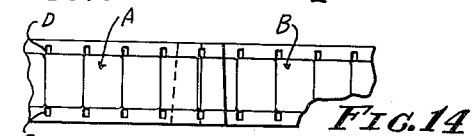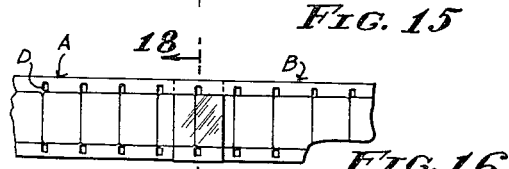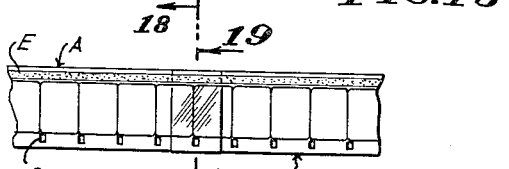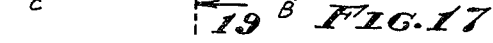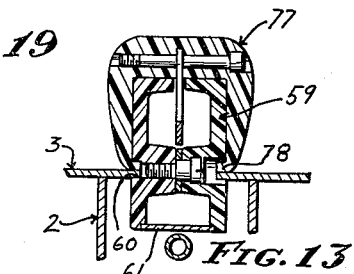

United States Patent Office 3,050,107
Patented Aug. 21, 1962

3,050,107
FILM SPLICER
William B. Barry, 279 Naomi Ave., Arcadia, Calif., and Philip T. Adams, 919 Palm Ave., South Pasadena, Calif.
Filed May 31, 1960, Ser. No. 33,044
9 Claims. (Cl. 156—486)

This invention relates to film splicers, and included in the objects of this invention are:

First, to provide a film splicer which is readily manipulated to shear adjacent overlapping ends of film strips to be joined, hold the resulting ends in abutment, apply a transparent adhesive binding tape across both sides of the abutting ends, and punch holes in the tape to match the sprocket holes in the film.

Second, to provide a film splicer of this type which may be used to splice film having a sound track along one margin, and wherein one or a pair of sprocket holes may be punched, depending on the type of film being spliced.

Third, to provide a novel clamp means for the film strips to be joined which tends to straighten the film strips longitudinally while being cut and spliced.

Fourth, to provide in a film splicer a novel means for measuring, cutting, and positioning a length of adhesive tape for application to abutting strips of film.

Fifth, to provide in a film splicer a novel means for pressing a transparent tape tightly over opposite sides of abutting strips of film.

With the above and other objects in view, as may appear hereinafter, reference is directed to the accompanying drawings in which:

FIGURE 1 is a top or plan view of the film splicer taken from the plane 1—1 of FIGURE 5;

FIGURE 2 is a transverse sectional view thereof taken substantially through 2—2 of FIGURE 5;

FIGURE 3 is a fragmentary, sectional view thereof taken substantially through 3—3 of FIGURE 5;

FIGURE 4 is a fragmentary, sectional view showing particularly the tape feeding shuttle plate taken through 4—4 of FIGURE 3;

FIGURE 5 is a longitudinal, sectional view thereof taken substantially through 5—5 of FIGURE 1, showing the parts in their initial position preparatory to receiving film strips to be spliced;

FIGURE 6 is a similar longitudinal, sectional view showing the parts of the film splicer in the position assumed during the shearing of the film strips;

FIGURE 7 is a fragmentary, partial side view, partial sectional view, showing the parts in the position assumed in the course of punching sprocket perforations in the binding tape which joins the film strips;

FIGURE 8 is a fragmentary, sectional view through 8—8 of FIGURE 5, showing the adhesive tape-holding means in the position wherein the end of the adhesive tape is held;

FIGURE 9 is a similar fragmentary, sectional view, showing the adhesive tape-holding means in its released position;

FIGURE 10 is a fragmentary, sectional view through 10—10 of FIGURE 6 showing the film-severing means;

FIGURE 11 is a fragmentary, sectional view of the punch means taken through 11—11 of FIGURE 6;

FIGURE 12 is another fragmentary, sectional view of the punch means taken through 12—12 of FIGURE 6;

FIGURE 13 is another fragmentary, sectional view of the punch means taken through 13—13 of FIGURE 6;

FIGURE 14 is a plan view showing the adjacent end portions of two film strips to be joined, indicating their overlapping ends;

FIGURE 15 is a substantially diagrammatical, edge view thereof, indicating the line on which the ends of the film strips are sheared;

FIGURE 16 is a plan view of one type of film as it appears when the strips of film are joined;

FIGURE 17 is a similar view of another type of film as it appears when strips thereof are joined;

FIGURE 18 is an enlarged, transverse, sectional view through 18—18 of FIGURE 16;

FIGURE 19 is an enlarged, transverse, sectional view through 19—19 of FIGURE 17.

The film splicer may be mounted on a suitable base 1, or set into a table. The film splicer includes a pair of side plates 2 which are joined to a top plate 3, preferably disposed at an incline. The material comprising the top plate 3 may continue over the ends of the side plates 2, to form front and rear end portions 4 and 5, respectively.

The top plate 3 is provided with a longitudinally extending slot 6 which continues to include the upper parts of the end portions 4 and 5. The top plate 3 is provided, slightly rearward of its center portion, with a film-receiving cross channel 7, which is in the form of a shallow recess of arcuate cross section. Located adjacent a margin of the cross channel or depression 7 are film-positioning pins 8.

Two sections of strips A and B of a conventional motion picture film are received by the pins 8. The pins are so located that when the strips A and B are placed thereon the frames of the two strips will be in proper relation to each other. As will be discussed in more detail hereinafter, conventional motion picture film may be provided with one set of sprocket perforations C or two sets of sprocket perforations C and D. In the first case, the one set of sprocket perforations is omitted so as to provide for a sound track E, as shown in FIGURE 17.

Each side of the top plate 3 laterally of the slot 6 is provided with a clamp plate 9 hinged along its rearward margin by a pivot pin 10. The clamp plate is adapted to fold forward over the corresponding portion of the film-receiving recess or channel 7 and is provided with an upturned handle 11. Fastened to the handle is a latch clip 12 which passes through a latch aperture 13 formed in the top plate 3 against an underlying strip of film. The underside of each clamp plate 9 is provided with a pad 14 which forces the underlying film into conformity with the recess 7.

It should be noted that film is normally contained in a roll, and therefore tends to curve longitudinally. By forcing the film to curve transversely in conformity with the recess or channel 7, the film is longitudinally stiffened. As a consequence, when two film strips are clamped so that their ends project over the slot 6 and in overlapping relation with each other, they do not curl but lay flat in a longitudinal direction. The channel 7 may be quite shallow so that the transverse curvature of the film strips does not interfere with the splicing operation.

Disposed forwardly of the channel 7, contiguous to the margin of a film strip placed on the pins 8, is a tape shuttle plate 15 which extends perpendicular to the top plate 3 and downwardly between the side plates 2. The shuttle plate 15 is substantially U-shaped, having a flat cross portion 16 and downwardly extending legs 17, the outer edges of which are contiguous to the side plates 2.

The legs 17 are guided by accommodation slots in the top plate 3, bordering the slot 6, and by guide lugs 18 projecting inward from the side plates 2. The bottom edge of the cross portion 16 is provided with a series of notches with intervening teeth which form a comb 19. A central slit 20 extends upwardly into the cross portion 16 beyond the comb 19.

The lower end of the legs 17 of the tape shuttle plate 15 are joined by a roller 21, around which is adapted to pass adhesive tape F. The adhesive tape is supplied from a spool 22 located near the forward end of the film splicer. The spool is supported by a bracket 22a having a clip 22b adapted to hook over the forward wall 4, as shown in FIGURES 5 and 6. The tape F passes from the spool 22 about an idler roller 23, then under the roller 21, and upwardly between the legs 17 of the shuttle plate 15.

Supported between the side plates 2 by a cross pin 24, below the lowest extreme positioned roller 21 of the tape shuttle plate 15, is a clamp spring 25 which is essentially U-shaped in side aspect. The forward leg of the clamp spring is formed by a pair of marginal strips 26 which are joined at their upper extremities to a forward clamp jaw 27. The other or rearward leg of the clamp spring 25 forms a central strip 28 which extends upwardly and is joined to a rearward clamp jaw 29.

The rearward clamp jaw 29 is provided with forwardly directed teeth which form a comb 30. The teeth of the comb 30 are adapted to intermesh with the teeth of the comb 19 when the tape shuttle plate 15 is in its lower position, as will be described in more detail hereinafter. The rearward side of the forward jaw 27 is provided with a pad 31 of rubber or other elastomer, and engages the forward extremity of the comb 30.

Secured to the rearward clamp jaw 29 is a U-shaped clip 32, the ends of which extend forward and are adapted to ride on the legs 17 of the tape shuttle plate 15, and in so doing hold the rearward clamp jaw 29 clear of the forward clamp jaw 27.

The legs 17 are provided with notches 33 which, when the shuttle plate 15 is in its upper position, such as shown in FIGURES 2 and 3, the ends of the clip enter these notches to allow the rearward clamp jaw 29 to move forward into contact with the pad 31 carried by the forward clamp jaw 27. The upper margins of the notches 33 are beveled so as to form cam elements for the purpose of engaging the extremities of the clip 32 and move them toward each other.

Mounted at opposite sides of the central strip 28 is a pair of transfer levers 34 adapted to pivot about a fulcrum pin 35, extending between the side plates 2 in the region between the central strip 28 and the legs 17 of the tape shuttle plate 15. The transfer levers 34 include forwardly directed upper arms 36 which extend forwardly between the legs 17 of the tape shuttle plate 15 to engage the forward tape clamp jaw 27. The arms 36 at their rearward portions are joined by a cross pin 37, which is engageable with the central strip 28 for urging this strip away from the tape shuttle plate 15, to move the rearward clamp jaw 29 clear of the pad 31.

The transfer levers 34 include downwardly and rearwardly extending arms 38, which terminate rearwardly of the central strip 28 and are connected by a cross pin 39. As will be brought out hereinafter, the cross pin 39 is engaged, by means described hereinafter, when the tape shuttle plate 15 approaches its lowermost position, to move the rearward clamp jaw 29 rearwardly until the extremities of the clip 32 clear the legs 17 of the tape shuttle plate 15, so that the legs of the shuttle plate retain the clip 32 in its rearward position until the shuttle plate is again raised to its upper position, shown in FIGURES 2, 3, and 5.

Pivotally mounted on a cross shaft 40 located near the lower extremities of the side plates 2, rearwardly of the cross pin 24, is a pair of handle levers 41 which extend upwardly beyond the top plate 3 and the forward end portion 4. The extended portions of the handle levers 41 are connected by a handle 42 and move in the slot 6 from a position rearwardly of the top plate 3 to a substantially vertical position immediately rearward of the cross channel 7 which receives the film strips. Also pivotally connected to the cross shaft 40 is a pair of blade levers 43 which are disposed between the handle levers 41.

The blade levers 43 move between a rearward position and a substantially vertical position, and terminate in blade-supporting arms 44 which, when the blade levers are in their forward position, overlie the film strips held in the film-receiving recess or channel 7. Secured between the blade-supporting arms 44 is a shearing blade 45. Also supported by the arms 40 on opposite sides of the shearing blade 45 are pads 46.

Pivotally supported between the blade levers 43 by a pivot pin 47 is a pair of anvil levers 48, which clamp therebetween an anvil 49 so arranged as to be engaged by the shearing blade 45 when the extremities of the anvil levers 48 are pivoted toward the blade-supporting arms 44. The forward extremities of the blade-supporting arms 44 and anvil levers 48 terminate contiguous to the tape shuttle blade 15 when the blade levers 43 are in their forward position, shown in FIGURE 6. The forward extremities of the shearing blade 45 and anvil 49 are dimensioned to project a short distance forwardly into the central slit 20 of the tape shuttle plate 15, as shown in FIGURE 6.

The anvil levers 48 are provided adjacent the anvil 49 with laterally directed ears 50 which, in the positions shown in FIGURES 6 and 10, underlie the extended ends of the film strips to catch them after being sheared.

The anvil levers 48 are joined by pivot pins 51 to a link 52, which in turn is joined by a pivot pin 53 extending between the handle levers 41. The manner in which the anvil levers 48 are connected to the blade levers 43 and to the handle levers 41 through the link 52 is such that when forward movement of the blade levers 43 is arrested by engagement with the tape shuttle plate 15 or other suitable stop, continued forward movement of the handle levers 41 forces the anvil 49 against the underside of the shearing blade 45. A spring 54 extending between the blade levers 43 and pivot pin 53 holds the blade levers 43 in a normally forward position relative to the handle levers 41, as shown in FIGURE 5.

Pivotally supported from each of the side plates 2 rearwardly of the tape shuttle plate 15 is a pair of shuttle plate levers 55 which extend rearwardly, each lever terminating in a tooth 56 which engages in a slot 57 provided in a corresponding leg 17 near its lower end.

The shuttle plate levers 55 are connected to the handle levers 41 by links 58 so arranged that on pivotal movement of the handle levers 41 the tape shuttle plate 15 is moved vertically between the positions shown in FIGURES 5 and 6. As the handle levers 41 approach their final forward position, they engage the cross pin 39 connecting the transfer levers 34 so as to move the rearward clamp jaw 29 a slight distance rearwardly.

Slidably mounted on the top plate 3, forwardly of the tape shuttle plate 15, is a carriage structure which includes complementary housing members 59 having guide grooves 60 which ride the margins of the slot 6. The undersides of the housing members 59 support a shearing blade 61 which extends rearwardly and closely overlies the forward tape clamp jaw 27, and is adapted, upon rearward movement of the housing members, to shear a section of tape projecting above the clamp jaw. A retracting spring 62 connected to a lug 63 depending from the shearing blade 61 and to an anchor block 64 normally holds the housing members 59 in their forward or retracted position.

The housing members 59 define a lever chamber 65, and their rearward portions define a transverse clearance slit bordered by an upper punch plate 66 and a lower punch plate 67. As will be brought out hereinafter, the punch plates are adapted to pass on opposite sides of abutting film sections held by the clamp plates 9 in the recess 7.

Journaled on a pivot pin 68 and extending forwardly to a point above the upper punch plate 66 is a punch lever 69 having downwardly extending punch prongs 70 adapted to move downwardly through the punch plate 67 and into mating punch openings 71 in the lower punch plate 67. A pair of lower toggle levers 72 are pivotally connected to the punch lever 69 intermediate its ends. The lower toggle levers 72 extends upwardly and are connected intermediate their ends to upper toggle levers 73 pivotally supported by a pin 74 at the upper portion of the lever chamber 65.

The pivotal connection between the lower and upper toggle levers 72 and 73 is adapted to move past the central line between the pivotal connection of the lower toggle levers 72 with the punch lever 69 and the pivot pin 74 so as to first depress and then raise the punch prongs 70; that is, the toggle levers move between the solid line and dotted line positions shown in FIGURE 6.

The upper extremities of the lower toggle lever 72 which are disposed between the upper toggle lever 73 are pivotally connected to a link 75 which extends forwardly and is provided with an upwardly directed end 76 which projects through an accommodation slot provided in the upper sides of the housing members 59. Fitted over the housing members 59 is a slide 77 of generally U-shaped cross section and having inturned lower margins 78 which fit in the guide grooves 60 above the top plate 3. The upwardly directed end 76 of the link 75 is pivotally connected to the slide 77.

Detent balls 79 backed by a spring 80 are urged outwardly from the opposite sides of the housing members 59 and are adapted to engage in rearward recesses 81 or forward recesses 82. These recesses tend to hold the slide 77 in its forward position shown by solid lines in FIGURE 6, or in its rearward position shown by dotted lines in FIGURE 6. The sides of the slide 77 are provided with finger bosses 83 so that the slide 77 may be grasped between the thumb and forefinger for movement not only of the slide but of the carriage structure as a whole. Extending forwardly of the housing members 59 is an upper presser finger spring 84 and a lower presser finger spring 85. These springs terminate in mutually-engaging rolled ends 86 located rearwardly of the housing members 59.

Mounted on the tape shuttle plate 15 by means of a lug 87 bent outwardly therefrom is a small stripping lever 88 having a finger 89 fitting into one of the slots of the comb 19. A spring 90 normally holds the stripping lever 88 in a position wherein the finger 89 is within the comb slot. However, if the stripping lever 88 is pivoted by forcing its lower end rearwardly, the finger 89 moves forwardly out of the comb slot. Mounted on the upper presser spring 84 is a trip cam 91 which is adapted to engage the stripping lever 88 upon rearward movement of the carriage structure.

As will be brought out hereinafter, it is desirable to stop the rearward travel of the carriage structure at two different positions. One of these positions may be determined by engagement of the forward end of the carriage structure with the tape shuttle plate 15, the other position is determined by means of a stop pin 92 which may be inserted laterally through the side plates 2, the stop pin being shown in position in FIGURE 6 and omitted in FIGURE 5.

Operation of the film splicer is as follows:

Initially the carriage structure is in its forward position, the handle levers are in their rearward position, the tape shuttle plate 15 is in its upper position, the clamp plates 9 are in their upper position, and the extremity of the adhesive tape F is flush with the upper sides of the clamp jaws 27 and 29. Two tape strips A and B to be joined are laid in the two portions of the cross channel or recess 7 with their ends overlapping, as shown in FIGURES 14 and 15.

The clamp plates 9 are moved downward to secure the film strips in position. The handle levers 41 are pivoted clockwise from the position shown in FIGURE 5 to the position shown in FIGURE 6. This motion of the handle levers 41 brings the shearing blade 45 and anvil 49 into position on opposite sides of the overlapping portions of the film and severs the film along the line 93 indicated in FIGURE 15. Simultaneously, the forward or clockwise movement of the handle levers 41 by means of the links 58 and shuttle plate levers 55 move the tape shuttle plate 15 downward from the position shown in FIGURE 5 to the position shown in FIGURE 6.

At the termination of this downward movement of the tape shuttle plate 15, the rearward clamp jaw 29 and its comb 30 are moved rearward by reason of the engagement of the handle lever 41 with the pin 39 of the transfer lever 34. This occurs at a position in which the comb 19 meshes with the comb 30. Initially, the extremities of the comb 30 project forwardly of the comb 19. On rearward movement of the comb 30 the arms 36 of the transfer levers 34 clear the forward clamp jaw 27, so that the pad 31 thereof moves rearwardly to press the end of the adhesive tape F against the comb 19 of the tape shuttle plate 15.

On return movement of the handle levers 41, that is, on movement counterclockwise from the position shown in FIGURE 6 to the position shown in FIGURE 5, the tape shuttle plate 15 is raised, bringing with it the upper end of the adhesive tape F so that a section of adhesive tape now projects above the clamp jaws 27 and 29. During this upward movement of the tape shuttle plate 15, the comb 30 remains clear of the tape by reason of the fact that the extremities of the clip 32 ride on the margins of the legs 17 of the tape shuttle plate 15. Just as the shuttle plate reaches its upper position, the extremities of the clips 32 enter the notches 33 so as to again clamp the adhesive tape.

It should be noted that the location of the roller 23 is such with respect to the roller 21 that the adhesive is not unrolled from the drum 22 during this upward movement. Thus there is little or no resistance to movement of the tape upwardly with the shuttle plate 15. However, during downward movement of the shuttle plate, while the tape is clamped between the comb 30 and pad 31, an appropriate length of tape is unrolled from the tape drum 22.

After the handle levers 41 have been returned to their rearward position shown in FIGURE 5, the carriage structure is moved forward from the position shown in FIGURES 5 and 6 to the position shown in FIGURE 7. This is accomplished by grasping the slide 77. Until forward movement of the carriage is resisted, the slide and carriage move as a unit with the slide in its forward position relative to the carriage, as shown in FIGURES 5 and 6.

During this initial movement the blade 61 cuts the adhesive tape flush with the clamp jaws 27 and 29. The approximate midportion of the severed section of tape is held by the shuttle plate 15 opposite the edges of the two abutting strips of film. Continued forward motion of the carriage causes the rolled ends of the presser fingers 84 and 85 to engage the upper and lower portions of the adhesive tape and press these portions over the upper and lower surfaces of the abutting film strips. Release of the upper extremities of the tape section is facilitated by engagement of the trip cam 91 with the stripping lever 88, which causes the finger 89 to free the tape from the comb 19.

When the carriage reaches its extreme rearward position, as represented by FIGURE 7, the punch prongs 70 and punch openings 71 align with the two rows of perforations in the type of film shown in FIGURES 14, 15, 16, and 18. Forward movement of the slide 77 from the position shown in FIGURE 6 to the position shown in FIGURE 7 causes the punch prongs 70 to penetrate the folded adhesive tape as shown in FIGURES 16 and 18. Continued forward movement of the slide 77 raises the punch lever 69, as indicated by dotted lines in FIGURE 6, and at the same time the detent balls 79 enter the forward recesses 82.

When the slide 77 is drawn forward to the initial position shown in FIGURES 5 and 6, the punch lever 69 remains elevated until the carriage is in its forward position, whereupon relative movement of the slide 77 from the dotted line position to the solid line position shown in FIGURE 6 restores the punch operating lever to its initial position.

If the film be of the type shown in FIGURE 17, in which a sound track E is provided along one margin in place of the second row of sprocket perforations D, only one perforation is made in the film tape. To accomplish this, the stop pin 92 limits the forward movement of the carriage structure so that the rearward punch prong 70 is in alignment with the perforations C. It is undesirable to cover the sound track E with adhesive tape F, therefore that portion of the adhesive tape extending above the film strips is slightly shorter than the lower portion of the adhesive tape, so that on folding the adhesive tape over the film the sound track E is exposed, as shown in FIGURES 17 and 19.

In order to thread the adhesive tape F from the tape spool 22, a curved guide member 94 is disposed under the idler roller 23 which extends to the clamp spring 25. With this arrangement a spare section of film may be threaded downward between the clamp jaws when they are in their separated position and caused to deflect under the roller 21, then forwardly under the idler roller 23 to engage the tape. The tape spool 22 may be readily removed by lifting the stop 64 and withdrawing the punch structure.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A film splicer, comprising: means for clamping a pair of film strips having sprocket perforations with their ends in overlapping relationship and their sprocket perforations in predetermined relation; means defining a single cutting plane for cutting through the double thickness of overlapping ends of a pair of film strips whereby the cut ends are in abutment; adhesive-tape feeding means for placing a section of tape perpendicular to corresponding edges of said film strips; means for folding said tape over opposite sides of said film strips to bridge said abutting ends and bind said film strips in end-to-end relationship; and means for forming a sprocket perforation in said tape in equal spaced relationship to the sprocket perforations in said connected film strips.

2. A film splicer, comprising: a frame structure defining a longitudinal slot; a pair of clamp elements on opposite sides of said slot for clamping a pair of film strips in overlapping relation; shearing blades movable through said slot to opposite sides of said film strips to shear the overlapping ends whereby the sheared ends of said film strips are in abutting relation; an adhesive-tape dispensing means including a shuttle element movable transversely to the edges of the abutting film strips, to place a section of adhesive tape substantially perpendicular to said edges, with one portion thereof above said film strips and the other portion below said film strips; and a slide structure including presser fingers engageable with said adhesive tape section to press the portions thereof onto the upper and lower surfaces of said film strips, whereby said adhesive tape section binds said strips together.

3. A film splicer, comprising: a frame structure defining a longitudinal slot; a pair of clamp elements on opposite sides of said slot for clamping a pair of film strips in overlapping relation; shearing blades movable through said slot to opposite sides of said film strips to shear the overlapping ends whereby the sheared ends of said film strips are in abutting relation; an adhesive-tape dispensing means including a shuttle element movable transversely to the edges of the abutting film strips, to place a section of adhesive tape substantially perpendicular to said edges, with one portion thereof above said film strips and the other portion below said film strips; and a slide member movable along said slot and including a knife for severing said section of tape, and pressure fingers movable through said shuttle element to engage the adhesive tape held thereby and press said tape over opposite sides of said film strips.

4. A film splicer for moving picture film having sprocket perforations, comprising: a frame structure defining a longitudinal slot; locating means on opposite sides of said slot adapted to fit certain sprocket perforations of film strips to place said film strips in overlapping relation with their sprocket perforations in continuing relation; clamp elements for securing said film strips in said overlapping relation; shearing blades movable through said slot to opposite sides of said film strips to shear the overlapping ends whereby the sheared ends of said film strips are in abutting relation; an adhesive-tape dispensing means including a shuttle element movable transversely to the edges of the abutting film strips, to place a section of adhesive tape substantially perpendicular to said edges, with one portion thereof above said film strips and the other portion below said film strips; and a slide structure including a knife for severing said section of tape, presser elements for applying said tape to opposite sides of said film strips adjacent their abutting ends, and punch means for perforating said tape in predetermined relation to the sprocket perforations in said film strips.

5. A film splicer, comprising: a pair of spaced clamping structures adapted to receive film strips to be joined and dispose the ends of said film strips in overlapping relation between said clamping structures, said clamping structures being curved transversely with respect to the lengths of said film strips whereby said film strips, when clamped, are transversely curved and the overlapping ends of said film strips extending from said clamping structures in the space therebetween are stiffened by reason of their transverse curvature; shearing means movable between said clamping structures to shear the overlapping ends of said film strips whereby the new ends of said film strips are disposed in abutting relation; and means for applying an adhesive tape over opposite sides of said abutting end portions.

6. A film splicer, comprising: a pair of spaced clamping structures adapted to receive film strips to be joined and dispose the ends of said film strips in overlapping relation between said clamping structure, said clamping structures being curved transversely with respect to the lengths of said film strips whereby said film strips, when clamped, are transversely curved and the overlapping ends of said film strips extending from said clamping structures into the space therebetween are stiffened by reason of their transverse curvature; shearing means movable between said clamping structures to shear the overlapping ends of said film strips whereby the new ends of said film strips are disposed in abutting relation; an adhesive-tape dispensing means including a shuttle element movable transversely to the edges of the abutting film strips, to place a section of adhesive tape substantially perpendicular to said edges, with one portion thereof above said film strips and the other portion below said film strips; and a slide structure including presser fingers engageable with said adhesive tape section to press the portions thereof onto the upper and lower surfaces of said film strips, whereby said adhesive tape section binds said strips together.

7. A film splicer, comprising: means for clamping a pair of film strips with their ends in overlapping relationship; means for cutting overlapping ends of film strips whereby the cut ends are in abutment; an adhesive-tape feeding means including means for supporting a roll of adhesive tape, a fixed means for holding an end of said tape, a shuttle member having a movable means for holding said tape, and means for transferring the tape end from said fixed holding means to said movable holding means for withdrawing a section of said tape, said shuttle member adapted to dispose said section of tape perpendicular to the edges of said film strips; and a slide structure including pressure fingers engageable with said adhesive tape section to press the portions thereof onto the upper and lower surfaces of said film strips, whereby said adhesive tape section binds said strips together.

8. A film splicer, comprising: a frame structure defining a longitudinal slot; a pair of clamp elements on opposite sides of said slot for clamping a pair of film strips in overlapping relation; shearing blades movable through said slot to opposite sides of said film strips to shear the overlapping ends whereby the sheared ends of said film strips are in abutting relation; an adhesive-tape feeding means including means for supporting a roll of adhesive tape, a fixed means for holding an end of said tape, a shuttle member having a movable means for holding said tape, and means for transferring the tape end from said fixed holding means to said movable holding means for withdrawing a section of said tape, said shuttle member adapted to dispose said section of tape perpendicular to the edges of said film strips; and a slide structure including pressure fingers engageable with said adhesive tape section to press the portions thereof onto the upper and lower surfaces of said film strips, whereby said adhesive tape section binds said strips together.

9. A film splicer for moving picture film having sprocket perforations, comprising: a frame structure defining a longitudinal slot; locating means on opposite sides of said slot adapted to fit certain sprocket perforations of film strips to place said film strips in overlapping relation with their sprocket perforations in continuing relation; clamp elements for securing said film strips in said overlapping relation; shearing blades movable through said slot to opposite sides of said film strips to shear the overlapping ends whereby the sheared ends of said film strips are in abutting relation; an adhesive-tape feeding means including means for supporting a roll of adhesive tape, a fixed means for holding an end of said tape, a shuttle member having a movable means for holding said tape, and means for transferring the tape end from said fixed holding means to said movable holding means for withdrawing a section of said tape, said shuttle member adapted to dispose said section of tape perpendicular to the edges of said film strips; and a slide structure inclduing a knife for severing said section of tape, presser elements for applying said tape to opposite sides of said film strips adjacent their abutting ends, and punch means for perforating said tape in predetermined relation to the sprocket perforations in said film strips.

References Cited in the file of this patent

UNITED STATES PATENTS

| | | |
|---|---|---|
| 1,564,848 | Herschede et al. | Dec. 8, 1925 |
| 1,590,347 | Cooke | June 29, 1926 |
| 2,346,874 | Russell | Apr. 18, 1944 |
| 2,499,686 | Selmin | Mar. 7, 1950 |
| 2,991,827 | Hendrich et al. | July 11, 1961 |
| 3,001,936 | Baumbach | Dec. 5, 1961 |